United States Patent
Moon et al.

(10) Patent No.: US 6,771,771 B1
(45) Date of Patent: Aug. 3, 2004

(54) METHOD AND DEVICE FOR ECHO CANCELLATION

(75) Inventors: Tae-Wook Moon, Seoul (KR); He-Sun Cho, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/433,683

(22) Filed: Nov. 4, 1999

(30) Foreign Application Priority Data

Nov. 4, 1998  (KR) ............................................. 98-47094

(51) Int. Cl.[7] ............................ H04M 1/00; H04M 9/08
(52) U.S. Cl. ........................... 379/406.01; 379/406.02; 379/406.06; 379/388.03; 379/387.02; 379/390.01
(58) Field of Search ..................... 379/406.01, 406.02, 379/406.03, 406.05, 406.06, 387.01, 387.02, 388.03, 388.05, 388.07, 390.01, 390.02, 390.03, 391, 392, 392.01, 394, 417; 370/286, 287, 288, 289, 290, 291, 292

(56) References Cited

U.S. PATENT DOCUMENTS

| | | | |
|---|---|---|---|
| 4,984,265 A | | 1/1991 | Connan et al. |
| 4,991,166 A | * | 2/1991 | Julstrom ..................... 379/399 |
| 5,787,165 A | * | 7/1998 | Lilja et al. ................... 379/399 |
| 5,796,818 A | | 8/1998 | McClennon et al. |
| 6,147,979 A | * | 11/2000 | Michel et al. .............. 379/410 |

FOREIGN PATENT DOCUMENTS

| | | |
|---|---|---|
| CN | 1169077 A | 12/1997 |
| EP | 0400979 A2 | 12/1990 |
| EP | 0515242 A1 | 11/1992 |

OTHER PUBLICATIONS

First Office Action dated Mar. 21, 2003 issued in a counterpart application, namely Appln. No. 99123512.6.

* cited by examiner

Primary Examiner—Rexford Barnie
(74) Attorney, Agent, or Firm—Dilworth & Barrese LLP

(57) ABSTRACT

An echo canceling device includes a first variable amplifier for variably amplifying an audio signal input through a microphone according to a control signal; a first analog-to-digital converter for converting an analog signal output from the first variable amplifier to a digital signal; a second digital-to-analog converter for converting a digital signal output from a digital signal processor to an analog signal; a second variable amplifier for variably amplifying a signal output from the second digital-to-analog converter according to a control signal; an input/output connector for connecting a signal output from the second variable amplifier to internal and external processing devices; a sound measurer for measuring a level of surrounding sounds input through the microphone; and the digital signal processor for executing an echo canceling routine, performing general digital signal processing and generating the control signals for controlling the first and second variable amplifiers according to the sound level measured by the sound measurer.

1 Claim, 4 Drawing Sheets

METHOD AND DEVICE FOR ECHO CANCELLATION

This application claims priority to an application entitled "Echo Canceling Device and Method" filed in the Korean Industrial Property Office on Nov. 4, 1998 and assigned Ser. No. 98-47094, the contents of which are hereby incorporated by reference.

BACKGROUND OF THE INVENTION

1. Field of the Invention

The present invention relates generally to echo canceling, and in particular, to a device and method for preventing the degradation of echo canceling performance due to saturation.

2. Description of the Related Art

In general, a term "echo" refers to a phenomenon when the sound output from a speaker is fed back to a microphone and then is output again through the speaker or returns through a wire or wireless line. When this feedback occurs, it is difficult to restore the original sound. In most cases, the feedback is so great that it drowns out the original signal by generating a high-pitched tone.

Referring to FIG. 1, there is shown a block diagram of a prior art device for echo canceling. First and second amplifiers 100 and 1amplify analog input signals, while analog-to-digital (A/D) converters 100 and 160 convert analog input signals to digital signals. In addition, digital-to-analog (D/A) converters 130 and 150 convert digital input signals to analog signals, while a digital signal processor (DSP) 140 performs echo canceling according to an echo canceling routine prepared therein in addition to general audio processing. An third amplifier 170 amplifies an input signal and provides the amplified signal to an input/output (I/O) connector 190, and an fourth amplifier 180 amplifies a signal input from the input/output connector 190. Finally, input/output connector 190 is connected to other internal or external audio processing blocks.

In an attempt to solve the echo problem of the prior art, the digital signal processor 140 performs convolutional coding for an audio signal input through a microphone and subtracts a specific value obtained by the coding from an audio signal output from a speaker. In this manner, the feedback is suppressed.

More specifically, an audio signal input through the microphone is input to the amplifier 100 designed to have a constant gain. The signal amplified by the amplifier 100 is then converted to a digital signal by the analog-to-digital converter 120. The converted digital audio signal undergoes convolutional coding with a specific filtering coefficient in the digital signal processor 140. A value obtained by convolutional coding is subtracted from a signal output to the speaker, thereby suppressing the echoes. However, in this echo canceling method, when the surrounding sounds of the external environment increase in level, the filtering coefficient and the input sounds exceed (or saturate) the processing limit of the digital signal processor. This results in the degradation of echo canceling performance.

SUMMARY OF THE INVENTION

It is, therefore, an object of the present invention to provide a device and method for preventing the degradation of echo canceling performance due to saturation.

To achieve the above object, the present invention provides an echo canceling device comprising a first variable amplifier for variably amplifying an audio signal input through a microphone. The first variable amplifier responds to a control signal generated by a digital signal processor. The echo canceling device also comprises a first analog-to-digital converter for converting an analog signal output from the first variable amplifier to a digital signal. In addition, a second digital-to-analog converter is included for converting a digital signal output from the digital signal processor to an analog signal. There is similarly provided a second variable amplifier for variably amplifying a signal output from the second digital-to-analog converter, an input/output connector for connecting a signal output from the second variable amplifier to internal and external processing devices, and a sound measurer for measuring a level of surrounding sounds input through the microphone. The digital signal processor executes an echo canceling routine, performs general digital signal processing, and generates the control signals for controlling the first and second variable amplifiers according to the sound level measured by the sound measurer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
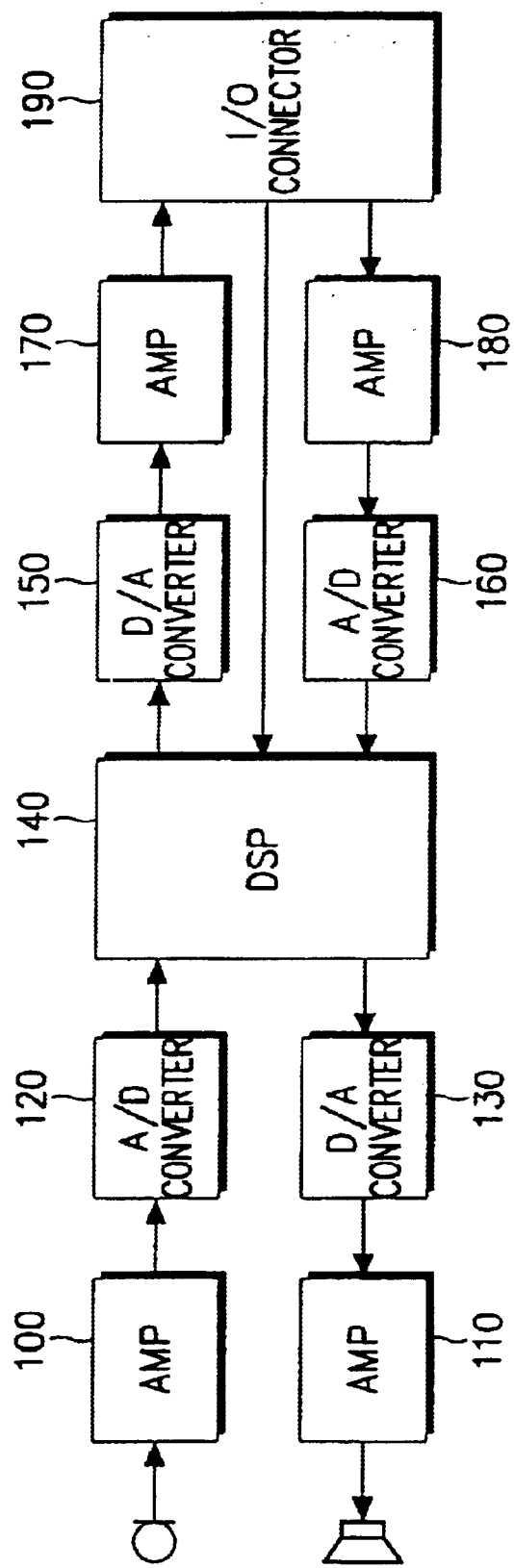
FIG. 1 is a block diagram of a device for echo canceling according to the prior art.
Figure 2:
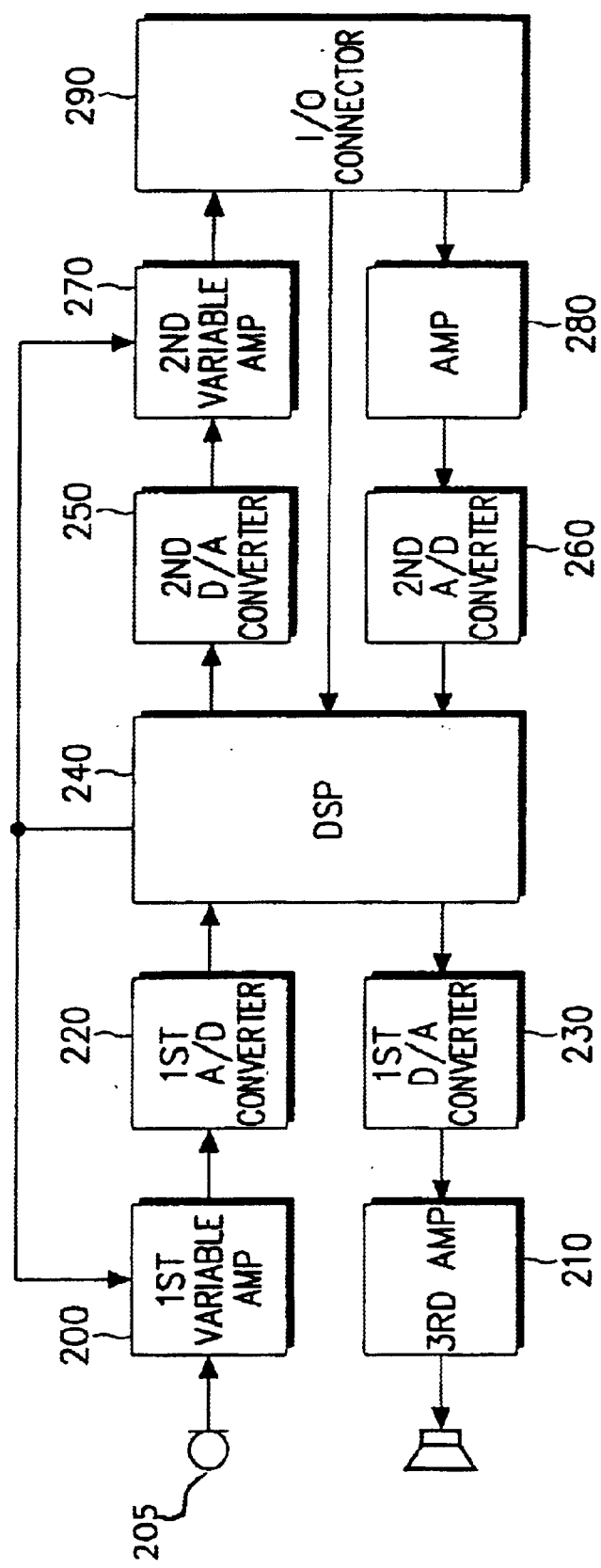
FIG. 2 is a block diagram of a device for echo canceling according to an embodiment of the present invention.

Referring to FIG. 2, there is shown a block diagram of a device for echo cancellation according to an embodiment of the present invention. A first and a second variable amplifier 200 and 270 are under the control of a digital signal processor 240 and amplify input signals from a microphone 205. A first and a second analog-to-digital (A/D) converter 230 and 260 convert analog input signals to digital signals from microphone and a fourth amplifier 280 respectively. A first and a second digital-to-analog converter 230 and 250 convert digital input signals from a digital signal processor (DSP) 240 to analog signals. The digital signal processor 240 performs echo cancellation according to an echo canceling routine prepared therein, and performs general audio processing. A third and fourth amplifiers 230 and 280 have fixed gains and amplify the input signals from first D/A converter 230 and an input/output connector 290. Input/output connector 290 is connected to other internal or external audio processing blocks and to DSP 240 and fourth amplifier 280. When the echo cancellation device is used in a hands-free set, the external processing block attached to I/O connector 290 can be a mobile telephone. In addition, when the echo cancellation device is used in a mobile telephone, the internal processing block stated above can be a radio frequency (RF) module.

Briefly, when there is an increase in level of the surrounding input sounds, the processing capability of the digital signal processor 240 may saturate. The present invention aims to prevent this saturation state and increase the canceling performance. Specifically, when an input sound is higher than a specified threshold, the gain of first variable amplifier 200 is decreased so that the level of the signal input to the digital signal processor 240 is reduced. On the other hand, when the input sound is lower than a specified threshold, the gain of first variable amplifier 200 is increased. This adjustment in the input gain prevents the saturation state.

Figure 3:
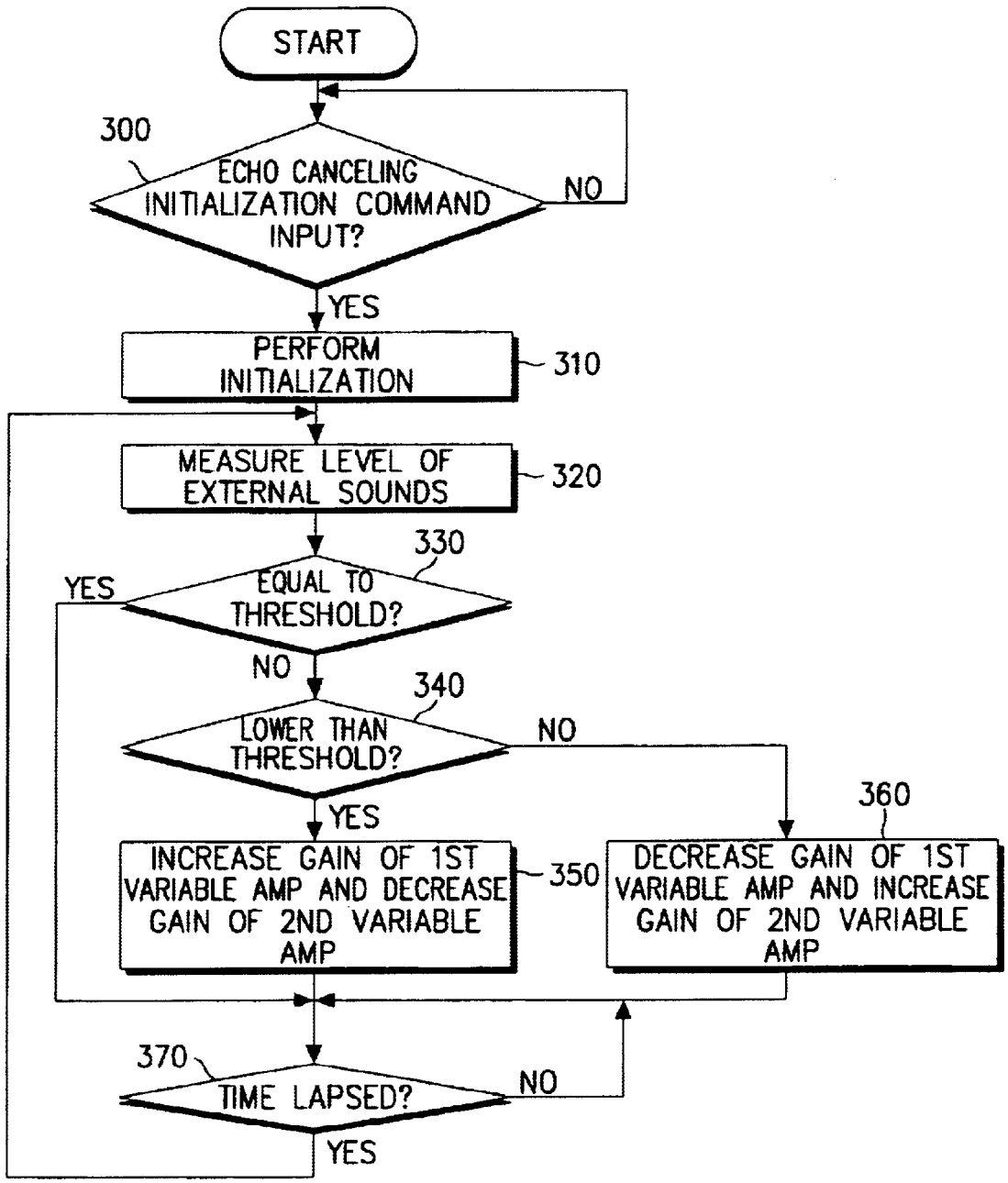
FIG. 3 is a flow chart illustrating a method for performing echo cancellation according to an embodiment of the present invention.

Turning now to FIG. 3, there is shown a flow chart illustrating a method for performing echo cancellation according to an embodiment of the present invention. When a call request command is received through the input/output connector 290 or an initialization command for echo canceling is generated in step 300, the procedure proceeds to step 310. In a code division multiple access (CDMA) hands-free set, initialization for echo canceling is performed by a conversation-on signal CONV_ON provided from the mobile telephone. However, in a GSM (Global System for Mobile communication) hands-free set, since the conversation-on signal is not provided, initialization for echo canceling is performed at regular intervals. In step 310, the digital signal processor 240 performs initialization for echo canceling to begin the execution of the echo canceling routine. In step 320, the digital signal processor 240 measures the level of surrounding sounds using a sound measurer (not shown). The sound measurer can have the structure shown in FIG. 4.

Figure 4:
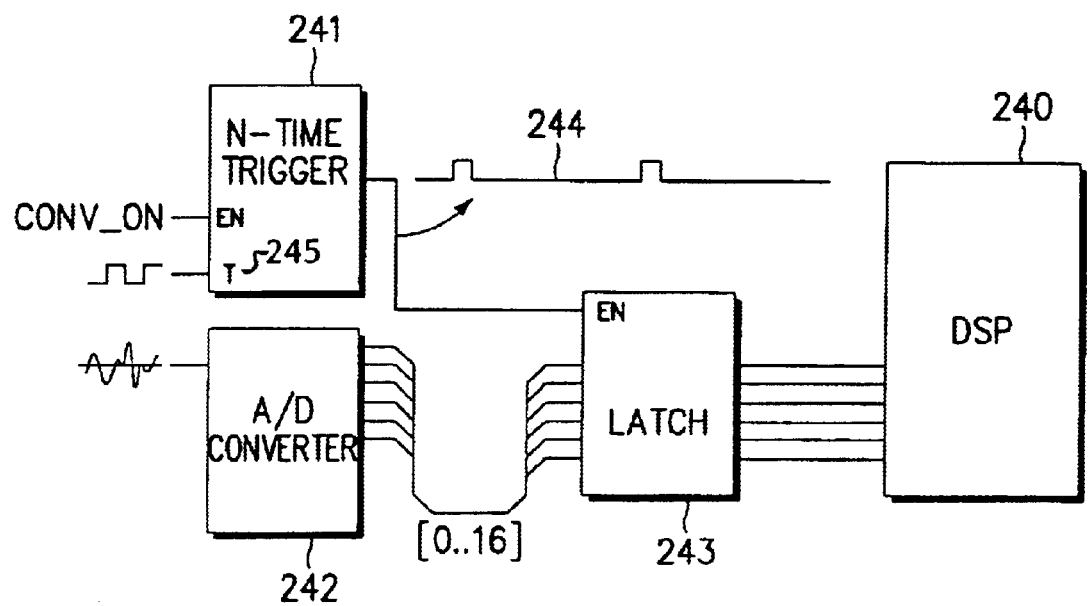
FIG. 4 is a block diagram of a device for measuring the level of sounds according to an embodiment of the present invention.

Referring to FIG. 4 there is shown a block diagram for measuring the level of sounds according to an embodiment of the present invention. An N-time trigger 241 is enabled in response to the conversation-on signal CONV_ON or a signal for starting the echo canceling routine. The N-time trigger 241 then generates a periodic pulse signal 244, which is ON and OFF at stated intervals, according to an input clock T 245. An analog-to-digital converter 242 has the same function as the first analog-to-digital converter 220 of FIG. 2, and it is possible to use the analog-to-digital converter 220 for the analog-to-digital converter 242. The analog-to-digital converter 242 converts an analog signal input from a microphone to a digital signal. A latch 243 is enabled or disabled in response to the pulse signal 244 output from the N-time trigger 241, and generates latched signals for the signals output from the analog-to-digital converter 242. The generated latched signals are input to the digital signal processor 240 to be used as fundamental data in controlling the gains of the first and second variable amplifiers 200 and 270.

Referring back to FIG. 3, the digital signal processor 240 determines whether the measured value of the sound is equal to a threshold in step 330. When the measured value is equal to the threshold, the procedure goes to step 370 so as to allow the first and second variable amplifiers 200 and 270 to operate with a fixed gain. When the measured value is not equal to the threshold, the digital signal processor 240 determines in step 340 whether the measured value of the sound is lower than the threshold. When the measured value is lower than the threshold, the procedure proceeds to step 350, and otherwise, goes to step 360. In step 350, the digital signal processor 240 increases a gain of the first variable amplifier 200 and decreases a gain of the second variable amplifier 270. The signal amplified with the increased gain in the first variable amplifier 200 is amplified with the decreased gain in the second variable amplifier 270, thereby maintaining the normal gain. In step 360, the digital signal processor 240 decreases the gain of the first variable amplifier 200 and increases the gain of the second variable amplifier 270. By decreasing the gain of the first variable amplifier 200, it is possible to prevent saturation due to an input of the high level sound. In addition, it is possible to maintain the normal gain by increasing the gain of the second variable amplifier 270 to compensate for reduction in gain of the first variable amplifier 200. After a predetermined period of time elapses in step 370, the procedure returns to step 320 where the digital signal processor 240 again measures the level of external sounds. In this manner, the level of the surrounding sounds is repeatedly measured at regular intervals, to vary the gains of the first and second variable amplifiers 200 and 270. In addition, the threshold mentioned above can be a value within a specific range having an upper limit and a lower limit, rather than a specific level of the sound. In other words, in step 330, it may be determined whether the external sound has a level between 40 dB and 50 dB. Table 1 below shows the relationship among the sound level, the first variable amplifier 200 and the second variable amplifier 270.

TABLE 1

|  | Sound Level < Specific Range | Sound Level is within Specific Range | Sound Level > Specific Range |
| --- | --- | --- | --- |
| 1st Variable Amp | Increment | Hold | Decrement |
| 2nd Variable Amp | Decrement | Hold | Increment |

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An echo canceling device comprising:

a first variable amplifier for variably amplifying an audio signal input through a microphone according to a control signal;

a first analog-to-digital converter for converting an analog signal output from the first variable amplifier to a digital signal;

a second digital-to-analog converter for converting a digital signal output from a digital signal processor to an analog signal;

a second variable amplifier for variably amplifying a signal output from the second digital-to-analog converter according to a control signal;

an input/output connector for connecting a signal output from the second variable amplifier to internal and external processing devices;

a sound measurer for measuring a level of surrounding sounds input through the microphone, wherein said sound measurer includes an N-time trigger being enabled in response to a specific command, for generating a periodic pulse signal which is ON and OFF at stated intervals;

a third analog-to-digital converter for converting an analog signal input through the microphone to a digital signal; and a latch being enabled in response to the pulse signal output from the N-time trigger, for generating latched signals for the signals output from the third analog-to-digital converter; and the digital signal processor for executing an echo canceling routine, performing general digital signal processing and generating the control signals for controlling the first and second variable amplifiers according to the sound level measured by the sound measurer.

* * * * *